Figure 2:
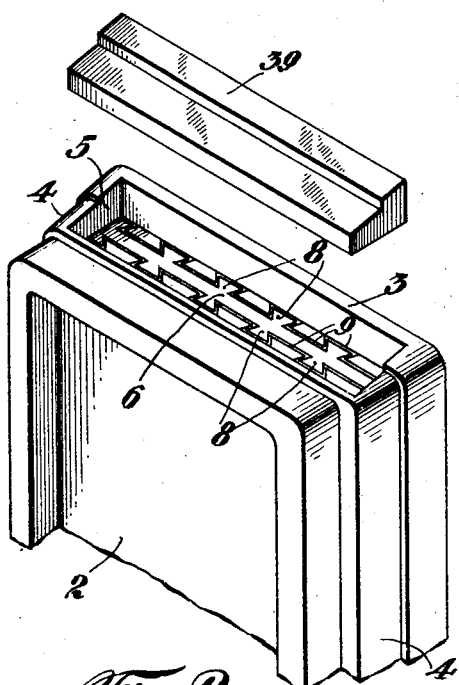

Nov. 20, 1928.　　　　　　　　　　　　　　　　1,692,550
G. M. GOLDSMITH ET AL
METHOD OF CONSTRUCTING VAULT OR SAFE DOORS AND THE LIKE
Filed Sept. 25, 1926　　　3 Sheets-Sheet 1
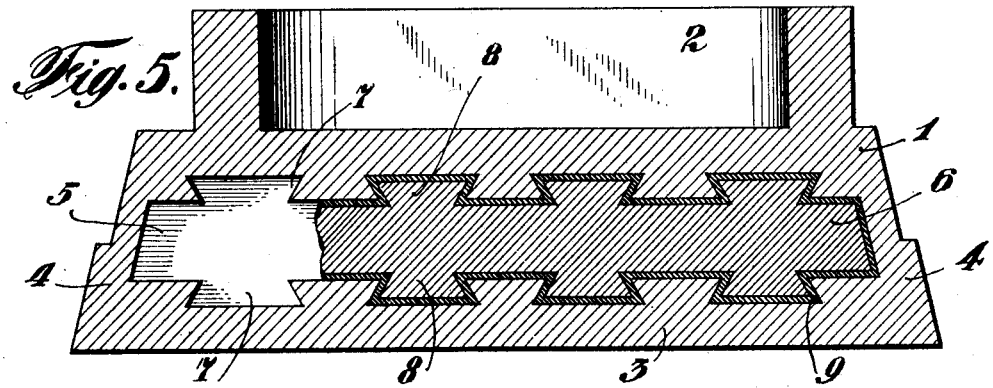
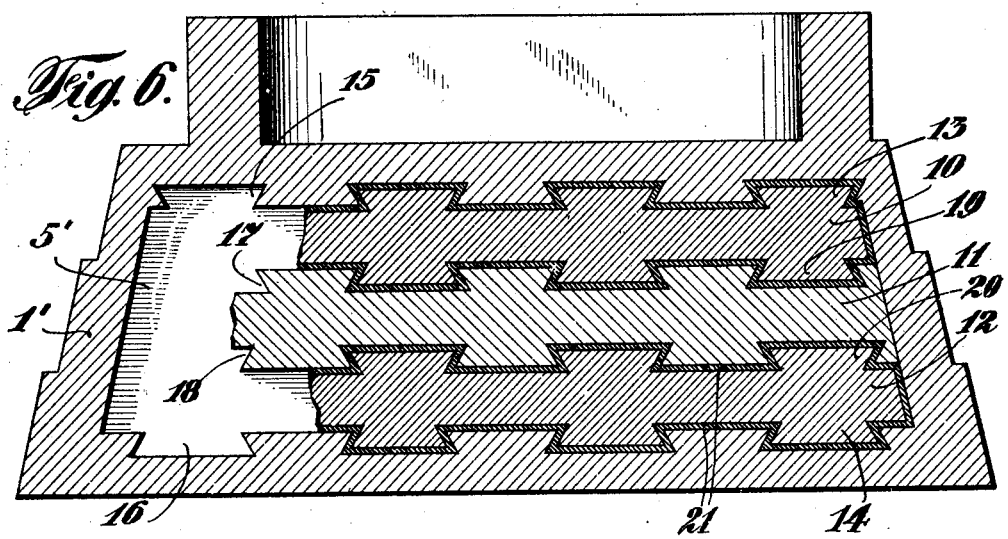
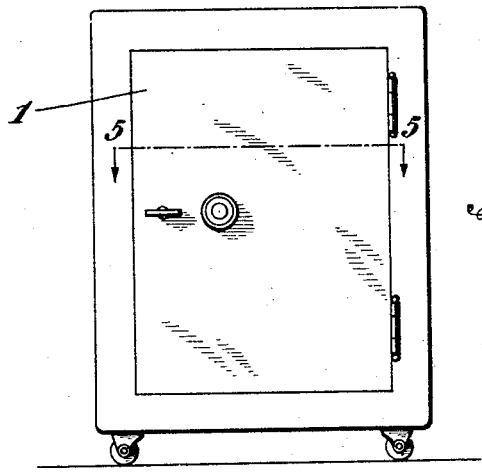
INVENTORS
Gustave M. Goldsmith
Carl Bartels
BY
ATTORNEY Nov. 20, 1928.　　　　　　　　　　　　　　　　　　　1,692,550
G. M. GOLDSMITH ET AL
METHOD OF CONSTRUCTING VAULT OR SAFE DOORS AND THE LIKE
Filed Sept. 25, 1926　　　3 Sheets-Sheet 2

INVENTORS
BY
ATTORNEY

Nov. 20, 1928.
G. M. GOLDSMITH ET AL
1,692,550
METHOD OF CONSTRUCTING VAULT OR SAFE DOORS AND THE LIKE
Filed Sept. 25, 1926
3 Sheets-Sheet 3
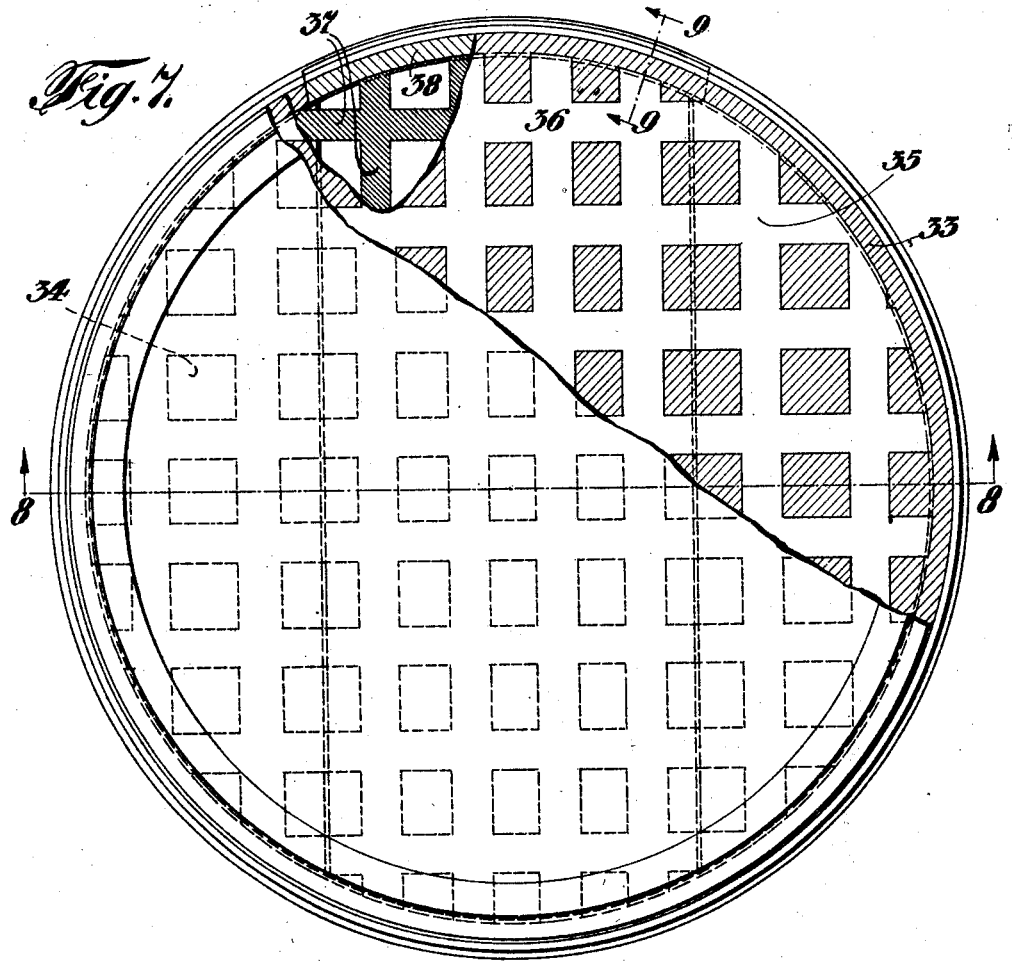
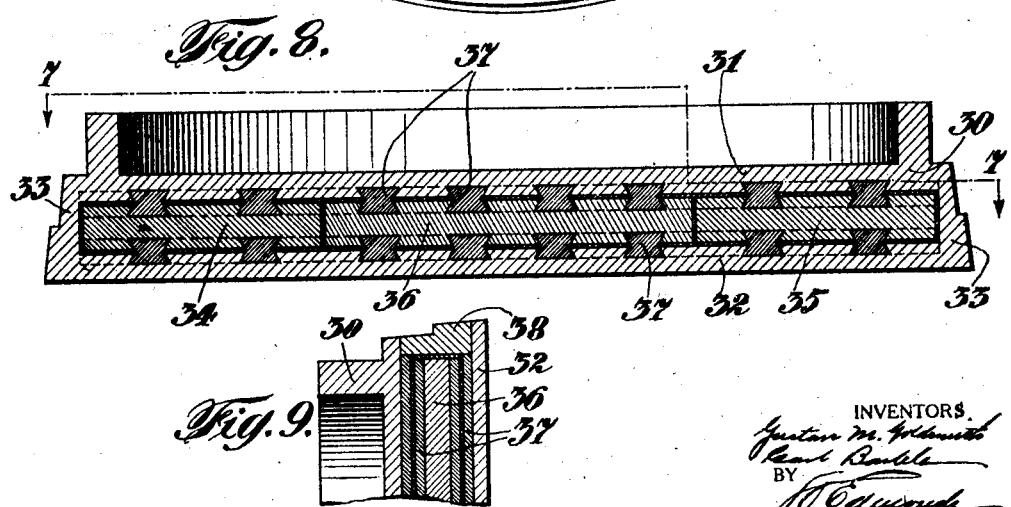
INVENTORS.
BY
ATTORNEY Patented Nov. 20, 1928.

1,692,550

UNITED STATES PATENT OFFICE.

GUSTAVE M. GOLDSMITH, OF CINCINNATI, AND CARL BARTELS, OF HAMILTON, OHIO, ASSIGNORS TO THE MOSLER SAFE COMPANY, OF HAMILTON, OHIO, A CORPORATION OF NEW YORK.

METHOD OF CONSTRUCTING VAULT OR SAFE DOORS AND THE LIKE.

Original application filed August 18, 1923, Serial No 658,004. Divided and this application filed September 25, 1926. Serial No. 137,654.

This invention relates to improvements in construction of burglar-proof vault doors and the like, and more particularly relates to a method of constructing metallic door walls and the like, incorporating alternate layers of burn-resisting material and drill-proof material.

This is a division of an application filed by us August 18, 1923, Serial No. 658,004, allowed September 8, 1925, and renewed August 23, 1926, for construction of vault or safe doors and the like.

In the construction of burglar-proof vault doors and similar structures incorporating burn-resisting material it is most desirable to have the burn-resisting material extend very close to the edges of the structure, and also to have as few cracks or joints as possible between sections of burn-resisting material, the purpose and result being to reduce to a minimum the areas of the structure which may be penetrated by means of an oxy-acetylene blow torch or similar agencies. When such structures are comprised of alternate strata or layers of drill-proof material and burn-resisting material, with the layers extending substantially across the entire area of the structure, the structure is burglar-proof to a very high degree.

The principal object of this invention is to provide a method of constructing a vault or safe door or similar structure which is highly resistant across substantially its entire area to penetration by means of an oxy-acetylene flame or similar agency, so that the structure affords a maximum amount of protection against attack from heat, flame and tools, and is burglar-proof to a very high degree.

Another object of this invention is to provide a method of constructing composite vault or safe doors or like structures, so that the component parts or layers may not be separated from each other.

Other objects of our invention will be in part obvious and in part pointed out hereinafter.

In accordance with our invention, in constructing a vault or safe door, we contemplate casting the door of steel with a central core or hollow, and with either or both the top and bottom of the door casting left off, and provided by a separate piece or pieces which are to be replaced later by welding or some other method. The central core or chamber extends very close to all edges of the casting, and into this core or chamber a one piece plate of burn-resisting material is inserted, so that it will extend across substantially the entire area of the door. The space between the burn-resisting plate and the adjacent walls of the steel casting are then filled in with molten metal, which may or may not have the same characteristics as the burn-resisting insert itself. Preferably the molten metal effectually welds both to the steel casting and to the burn-resisting insert, thus tying the entire structure together.

It is also contemplated that the steel casting will have dovetails cast in conjunction with the core, and that the burn-resisting insert will have dovetails cast on it, the latter dovetails being smaller than the dovetails in the core of the steel casting but interlocking with the latter, so that when the molten metal is poured between the burn-resisting insert with its dovetails and the steel casting with its dovetails, there will be no means whereby these two series of dovetails can be separated. For further protection we contemplate having the dovetails on the burn-resisting insert and in the core of the steel casting beveled vertically, the bevel on one side to be downward and the bevel on the other side to be upward, so that under no circumstances can the burn-resisting insert be slid out of the core of the steel casting. Obviously one or two or more burn-resisting inserts may be used dependent on the thickness of the structure.

In order that a clearer understanding of this invention may be had, attention is hereby directed to the accompanying drawings, forming a part of this application and illustrating certain possible embodiments of our invention.

Figure 3:
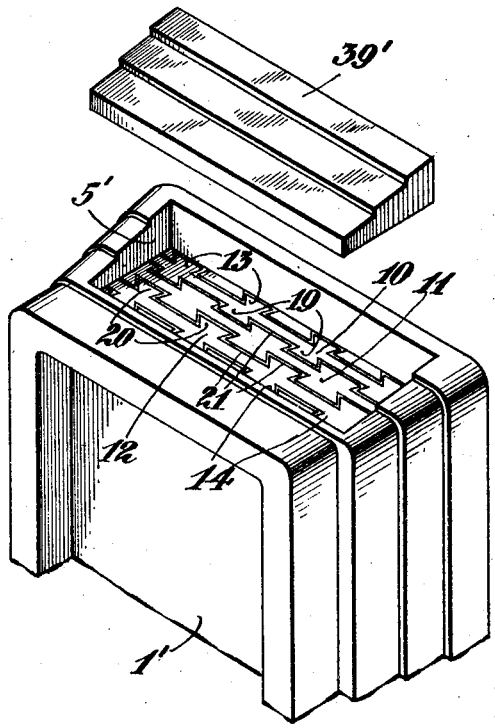
Figure 4:
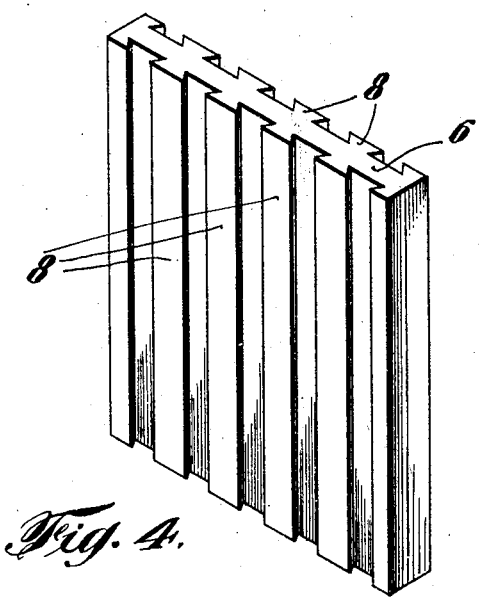

Referring to the drawings, Fig. 1 is a front view of a safe embodying our invention; Fig. 2 is a perspective view of a portion of a safe or vault door embodying our invention, and showing the cover plate removed, exposing the insert of burn-resisting material; Fig. 3 is a view similar to Fig. 2, but shows a door of thicker construction; Fig. 4 is a perspective view of a burn-resisting insert such as is incorporated in the constructions illustrated in Figs. 2 and 3; Fig. 5 is a horizontal sectional view of the door shown in Fig. 2; Fig. 6 is a horizontal sectional view of the door shown in Fig. 3; Fig. 7 is a plan view of a circular safe or vault door, certain portions being broken away, as on line 7—7 of Fig. 8, to different depths to more clearly show the construction; Fig. 8 is a sectional view of the door shown in Fig. 7 and is taken on the line 8—8 of Fig. 7; and Fig. 9 is a sectional view of a fragment of the door and is taken on the line 9—9 of Fig. 7.

Similar reference characters refer to similar parts throughout the several views of the drawings.

Referring to the drawings, as shown in Figs. 2 and 5, the door consists of an integral metallic body member 1 forming the interior 2, the exterior 3, and the edge portions 4 of the door, and having an interior chamber or hollow 5, in which is seated a separate inserted metallic member 6. The opposite surfaces of the chamber 5 are formed to provide dovetailed recesses 7, in which are seated dovetailed tongues 8 formed on opposite sides of the insert 6. Recesses 7 and tongues 8 preferably extend longitudinally across the insert 6. The insert 6 is made somewhat smaller than the chamber 5 but of similar shape, and the insert 6 is firmly and tightly bound to the body member 1 by means of a suitable binding material 9, which has been placed in the space between the insert 6 and the walls of the chamber 5. For such binding material, we preferably utilize molten metal, such as lead, copper, zinc or other material, which, after being poured into the crevices and allowed to solidify, will serve to bind the insert 6 and body member 1 together with excellent efficiency. The molten metal may be burn-resisting material.

If a thicker wall with a plurality of inserted plates or layers is desired, such as is shown in Fig. 3, the recess 5' is enlarged so as to accommodate more than one insert. If three inserts are desired, such as 10, 11 and 12 (Fig. 3), the inserts adjacent the front and rear of the chamber 5' may be provided with dovetailed projections, such as 13 and 14, which enter recesses, such as 15 and 16, provided respectively on the rear and front sides of the chamber 5'. The central insert 11 may be provided on opposite sides with dovetailed recesses 17 and 18, in which are adapted to interlock correspondingly shaped tongues, such as 19, formed on insert 10, and tongues 20 formed on insert 12. These inserts may be of such size that they do not fit closely against each other nor against the walls of the chamber 5', and they may be bound together and to the body member 1' within the recess 5' by means of suitable binding material 21 placed in the crevices or spaces between the adjacent parts. When a plurality of inserted sections or layers are used, alternate layers of drill-proof material and burn-resisting material may be used. Thus, as illustrated in Fig. 6, the middle layer 11 may be formed of drill-proof material, the same as the walls 1' of the structure, with layers of burn-resisting material 10 and 12 disposed therebetween. As above mentioned, such binding material 21 may comprise metal which has been poured into the crevices in molten condition.

In Figs. 7, 8 and 9, there is illustrated the construction of a circular door, having a metallic body portion 30 providing the inner wall 31, outer wall 32, and periphery 33 of the door wall. This wall is constructed to have a circular chamber with an opening through the margin 33 and leading into the chamber. The front and rear surfaces of the circular chamber are shaped to provide dovetailed recesses which extend across the chamber. These recesses may extend in one direction only or may extend in two directions at right angles to each other. Within the chamber in the wall are placed slabs or sheets of metallic material. One possible manner of inserting such material in the chamber is to separately insert two segmental portions or sections through the opening in the wall margin 33, and sliding these sections laterally into their final position, and then inserting through the opening into the chamber a slab of proper size and shape to fill the remainder of the chamber. These inserted sections are shaped to provide dovetailed recesses, which, when the slabs have been properly positioned within the chamber, will register with the recesses provided on the inner and outer walls of the chamber. The inserted slabs may then be readily and easily secured to the body portion 30 by pouring molten metal or similar material 37 into the aligned recesses in the body portion 30 and inserted sections 34, 35 and 36 until all the recesses have been filled by the molten material. The inserts 34, 35 and 36 are preferably made smaller than the chamber in thickness, in order to create crevices between the inserts and between the inserts and the walls of the chamber through which the molten binding material may flow. Upon hardening, the molten binding material will firmly and tightly unite the inserts to the body portion 30. When this has been accomplished, the opening in the margin 33 of the body member 30 may be closed by means of a separate metallic member, such as 38, which is shaped to fit the opening and which may be welded to the body portion 30 to complete the construction of the wall.

The insertion of the insert 6 in the construction shown in Fig. 2 or the inserts 10, 11 and 12 shown in Fig. 3 and the binding material may be accomplished in a manner similar to that described in connection with the construction of the circular wall, that is, a suitable opening may be left in the body portion 1 or 1', and after the desired members and material have been inserted in their proper place, the opening may be closed by a suitable separate member 39, 39' or by other means.

Although, in the constructions illustrated and described, the grooves and tongues have been shown as being dovetailed, it is to be understood that the grooves or tongues need not be of dovetailed shape, but their form may be varied considerably.

When the dovetailed construction is employed, further protection may be secured by casting the dovetails so that they are beveled vertically, preferably with the bevels on one side downward and the bevels on the other side upward, so that under no circumstances can the burn-resisting insert be slid out of the core of the steel casting, even should the cover plate 39 or 39' be removed.

It will be readily apparent that the construction above described gives protection across substantially the entire area of the structure, and that the entire structure is tied together into a substantially integral body, from which the component parts may not be separated. Although, in the above description, we have emphasized the incorporation of burn-resisting metal in the construction, intending by such term to designate inserts composed of metals which will offer great resistance to penetration by means of high heat or flame, such as is created by an oxy-acetylene blow torch or similar agencies, it is to be understood that other metals may be substituted for the inserts, and that any kind of metal which lends itself to casting may be employed for the steel casting. Instead of using previously formed inserts, the material of the insert may be poured in molten condition directly into the hollow of the main casting and allowed to set.

As many changes could be made in the above method and construction and as many apparently widely different embodiments of this invention could be made without departing from the scope thereof, it is intended that all matter contained in the above description or shown in the accompanying drawings shall be interpreted as illustrative and not in a limiting sense.

What we claim is:—

1. The method of constructing walls for safes, which consists of placing a metallic insert having recesses between recessed walls of a chamber in a metallic body portion with the recesses in said insert and chamber walls in alignment, surrounding said insert and filling said aligned recesses and the cracks and crevices between the insert and the body portion by flowing molten material into said recesses, cracks and crevices, the molten material solidifying therein.

2. The method of constructing walls for safes, which consists of placing a metallic insert having undercut recesses between undercut-recessed walls of a chamber in a metallic body portion with the recesses in said insert and chamber walls in alignment, surrounding said insert and filling said aligned recesses and the cracks and crevices between the insert and the body portion by flowing molten material into said recesses, cracks and crevices, the molten material solidifying therein.

This specification signed this 16th day of September, 1926.

GUSTAVE M. GOLDSMITH.

This specification signed this 17th day of September, 1926.

CARL BARTELS.